(12) United States Patent
Yoder

(10) Patent No.: US 12,640,765 B2
(45) Date of Patent: May 26, 2026

(54) SMART PHONE CASE ASSEMBLY

(71) Applicant: John Yoder, Holmesville, OH (US)

(72) Inventor: John Yoder, Holmesville, OH (US)

( * ) Notice: Subject to any disclaimer, the term of this patent is extended or adjusted under 35 U.S.C. 154(b) by 852 days.

(21) Appl. No.: 17/874,001

(22) Filed: Jul. 26, 2022

(65) Prior Publication Data

US 2024/0039572 A1 Feb. 1, 2024

(51) Int. Cl.
*H04B 1/3827* (2015.01)
*H04B 1/3888* (2015.01)
*H04M 1/04* (2006.01)

(52) U.S. Cl.
CPC ........... *H04B 1/385* (2013.01); *H04B 1/3888* (2013.01); *H04M 1/04* (2013.01); *H04B 2001/3866* (2013.01)

(58) Field of Classification Search
CPC .................. H04B 1/385; H04B 1/3888; H04B 2001/3866; H04M 1/04; H04M 1/185
See application file for complete search history.

(56) References Cited

U.S. PATENT DOCUMENTS

| | | |
|---|---|---|
| 8,333,310 B2 | 12/2012 | Tages |
| 9,038,870 B2 | 5/2015 | Johnson |
| 9,456,066 B2 | 9/2016 | Singhal |
| 2012/0264492 A1 | 10/2012 | Stewart |
| 2015/0157078 A1 * | 6/2015 | Kendis ...................... A45F 5/02 24/3.12 |
| 2017/0366652 A1 * | 12/2017 | Boerckel ................ H04N 23/51 |
| 2019/0289972 A1 * | 9/2019 | Lombardo .......... H04M 1/0283 |

FOREIGN PATENT DOCUMENTS

| | | |
|---|---|---|
| AU | 2011235267 | 10/2011 |
| CN | 212343852 | 1/2021 |

\* cited by examiner

*Primary Examiner* — Yuwen Pan
*Assistant Examiner* — Fatuma G Sherif

(57) ABSTRACT

A smart phone case assembly includes a case that is structured to insertably receive a smart phone. The case has a plurality of holes extending through the case and each of the holes is strategically located to facilitate control buttons of the smart phone and a camera of the smart phone to be exposed when the smart phone is positioned in the case. A clip is hingedly disposed on the case and the clip is positionable in a stored position having the clip resting against the case. The clip is positionable in a deployed position having the clip angling away from the case. The clip insertably receives a brim of a hat to secure the case to the brim thereby facilitating the smart phone to be oriented for recording video footage.

9 Claims, 7 Drawing Sheets

SMART PHONE CASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone case devices and more particularly pertains to a new phone case device for mounting a smart phone to the brim of a hat. The device includes a smart phone case and a clip pivotally attached to the smart phone case. The clip engages a brim of a hat for mounting the smart phone case to the brim. Furthermore, the clip is oriented such that the smart phone case is positioned in landscape position to facilitate a smart phone in the smart phone case to record video footage in a hands free manner.

(2) Description of Related Art Including Information Disclosed Under 37 CFR 1.97 and 1.98

The prior art relates to phone case devices including a smart phone case that includes a backplate and a retractor for retracting a headphone cord. The prior art discloses a clip assembly for a smart phone case that includes a plurality of sockets and plugs that engage the sockets. The prior art discloses a head mount for a smart phone that includes a buckle and a plurality of straps that engage the buckle for supporting the buckle on a user's head. The prior art discloses a protective case for a smart phone that includes fabric straps extending around the protective case. The prior art discloses a smart phone holder that includes a hat which has a smart phone pocket for aligning a smart phone with a user's ear when the hat is worn.

BRIEF SUMMARY OF THE INVENTION

An embodiment of the disclosure meets the needs presented above by generally comprising a case that is structured to insertably receive a smart phone. The case has a plurality of holes extending through the case and each of the holes is strategically located to facilitate control buttons of the smart phone and a camera of the smart phone to be exposed when the smart phone is positioned in the case. A clip is hingedly disposed on the case and the clip is positionable in a stored position having the clip resting against the case. The clip is positionable in a deployed position having the clip angling away from the case. The clip insertably receives a brim of a hat to secure the case to the brim thereby facilitating the smart phone to be oriented for recording video footage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
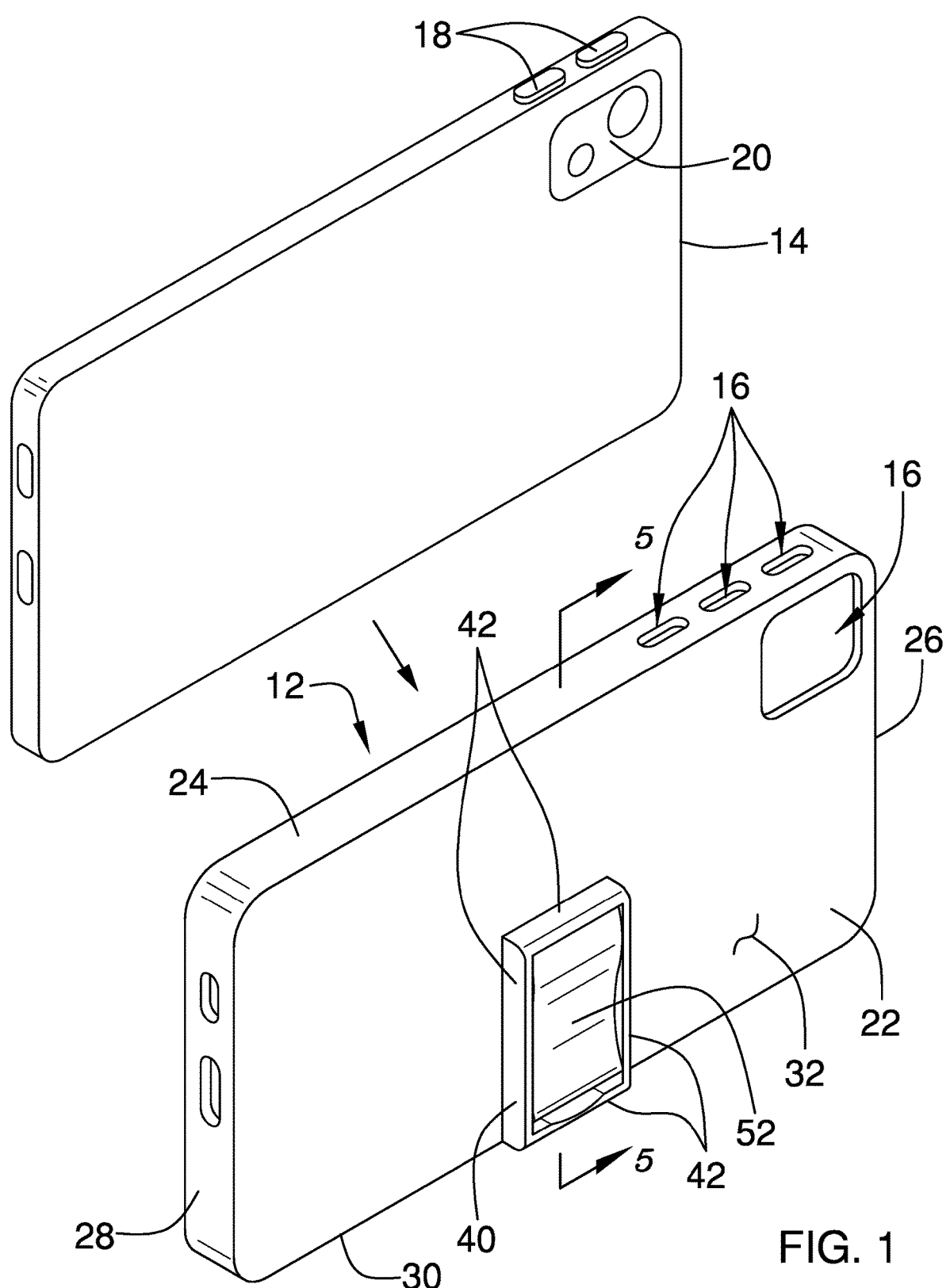
FIG. 1 is a front perspective view of a smart phone case assembly according to an embodiment of the disclosure showing a clip in a stored position.
Figure 2:
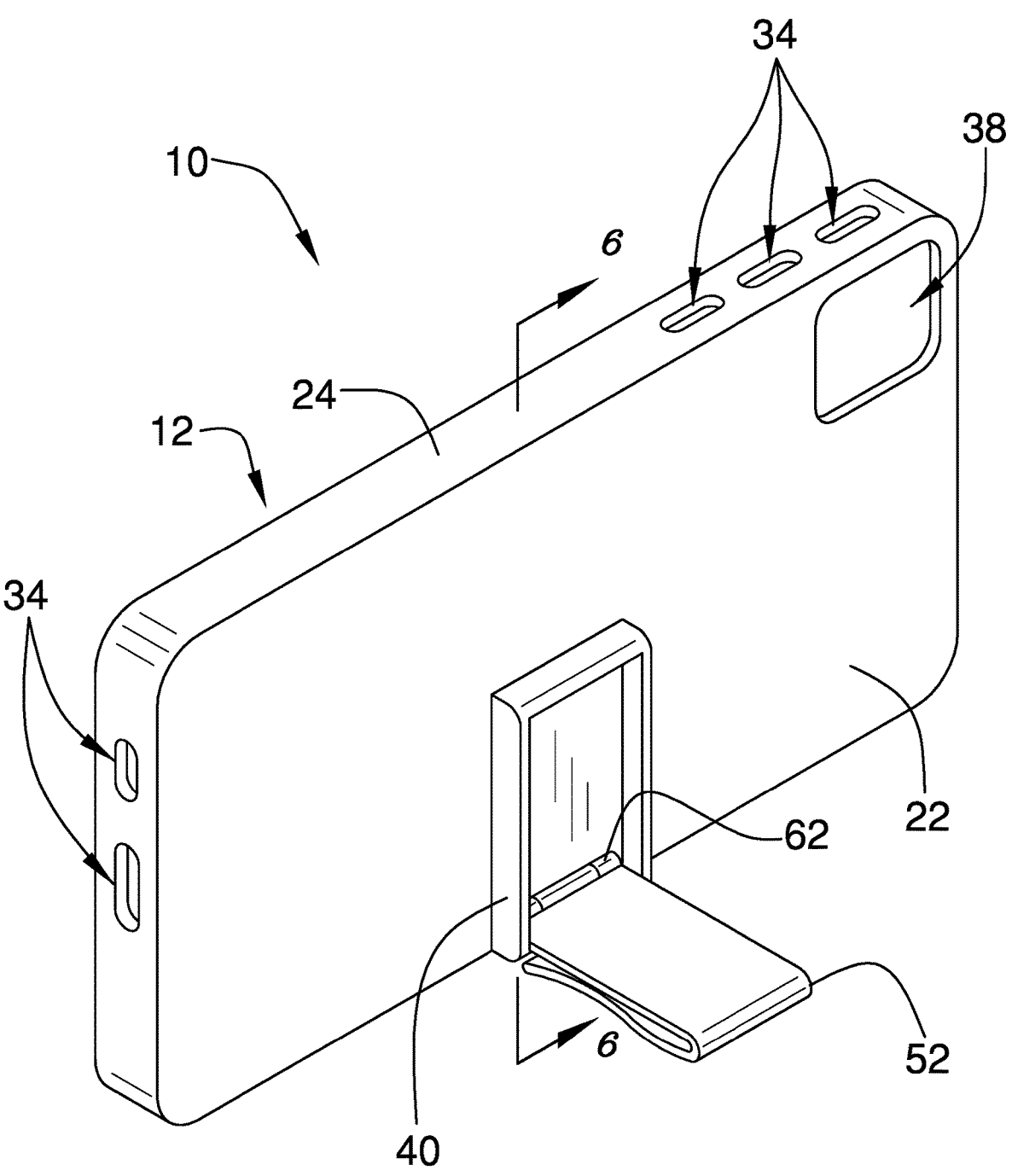
FIG. 2 is a front perspective view of an embodiment of the disclosure showing a clip in a deployed position.
Figure 3:
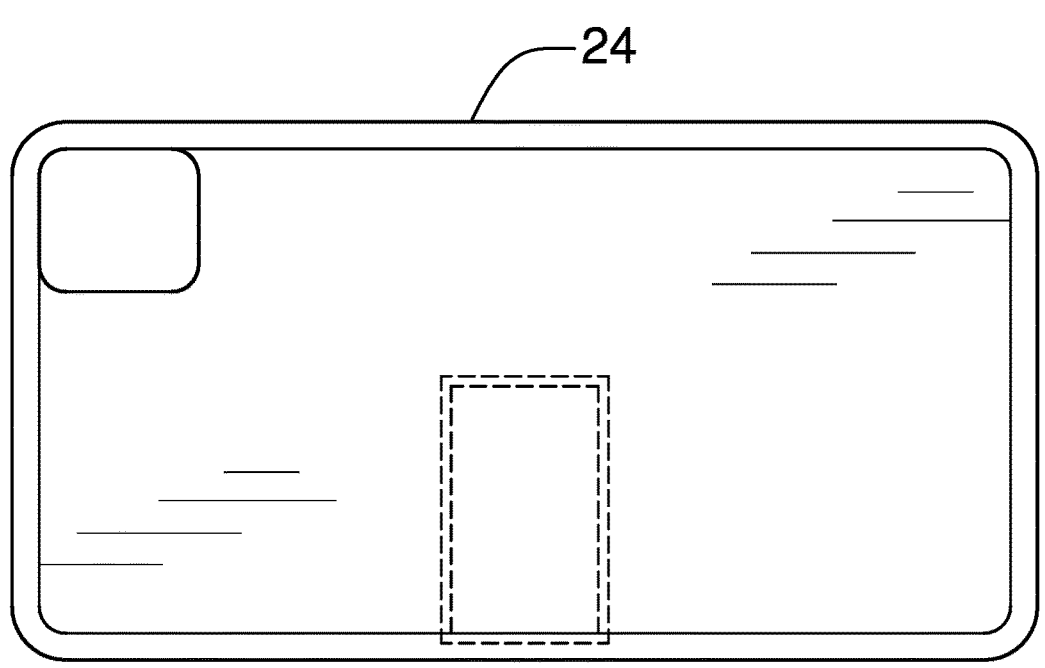
FIG. 3 is a back phantom view of an embodiment of the disclosure.
Figure 4:
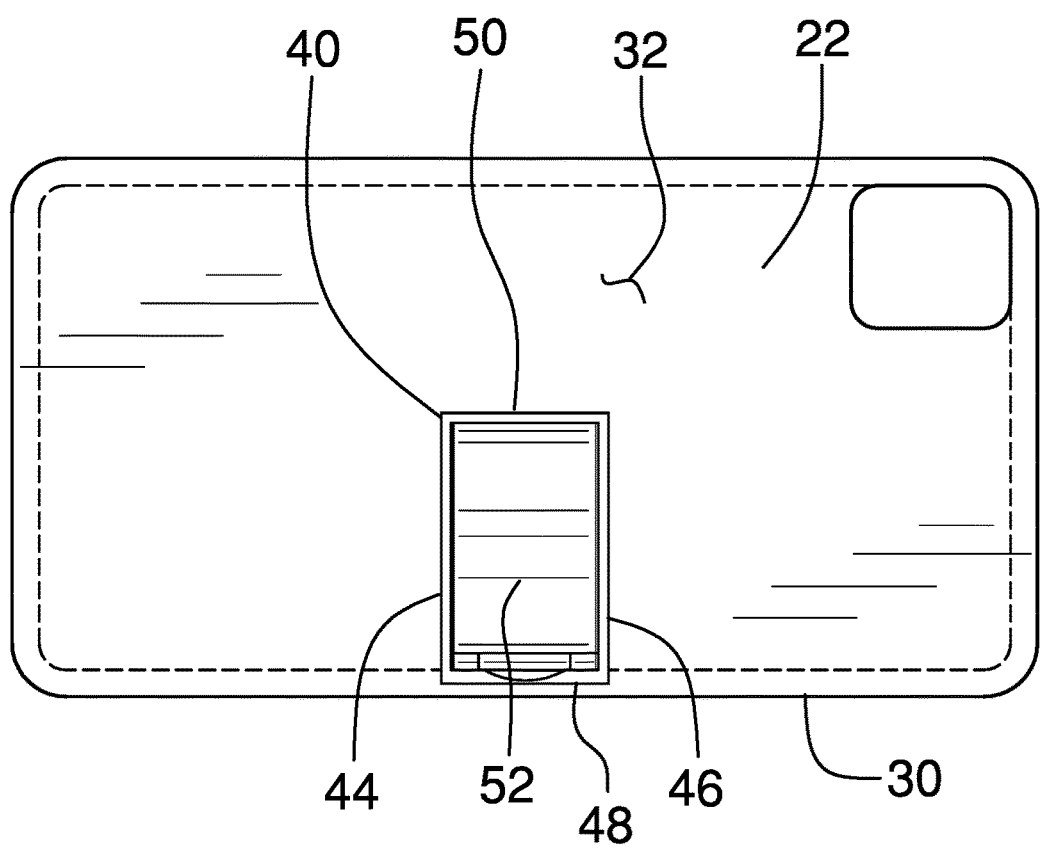
FIG. 4 is a front phantom view of an embodiment of the disclosure.
Figure 6:
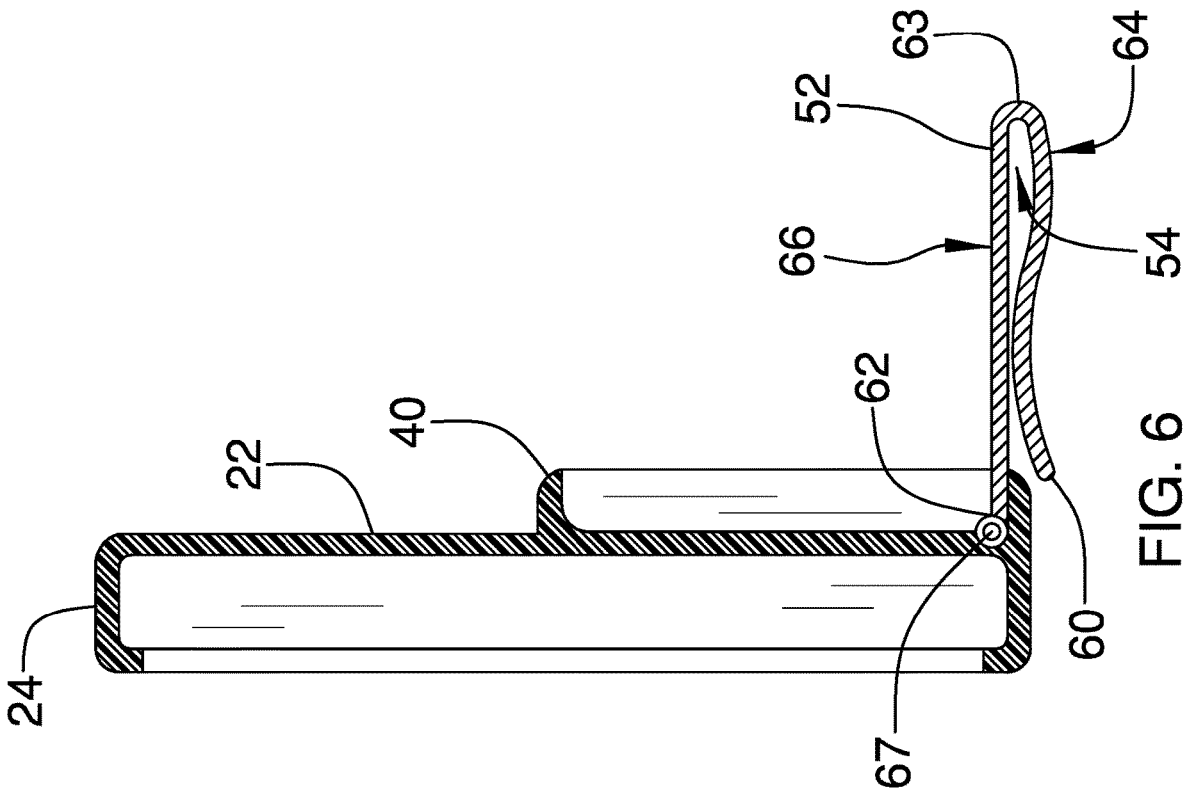
FIG. 6 is a cross sectional view taken along line 6-6 of FIG. 2 of an embodiment of the disclosure.
Figure 5:
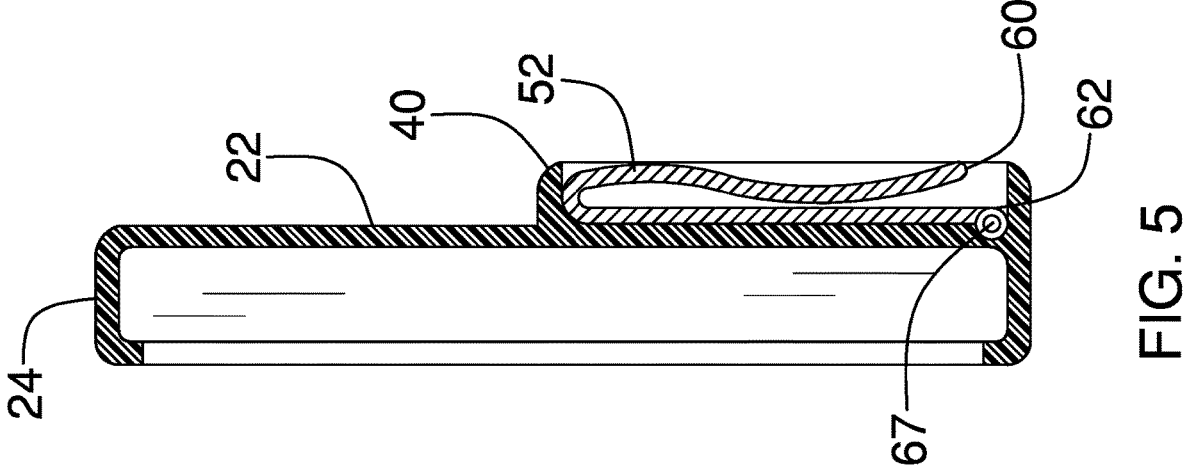
FIG. 5 is a cross sectional view taken along line 5-5 of FIG. 1 of an embodiment of the disclosure.
Figure 7:
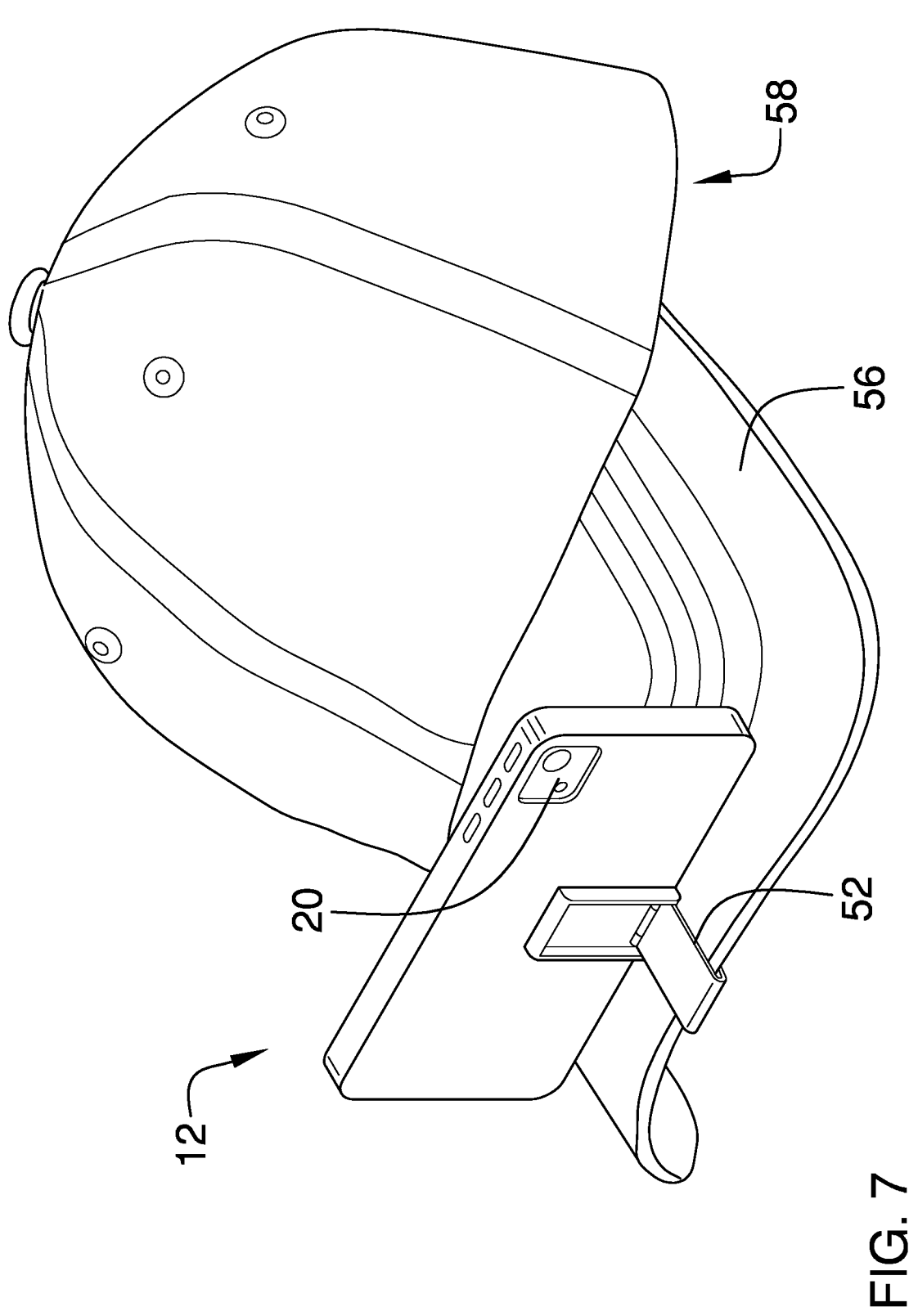
FIG. 7 is a perspective in-use view of an embodiment of the disclosure.
Figure 8:
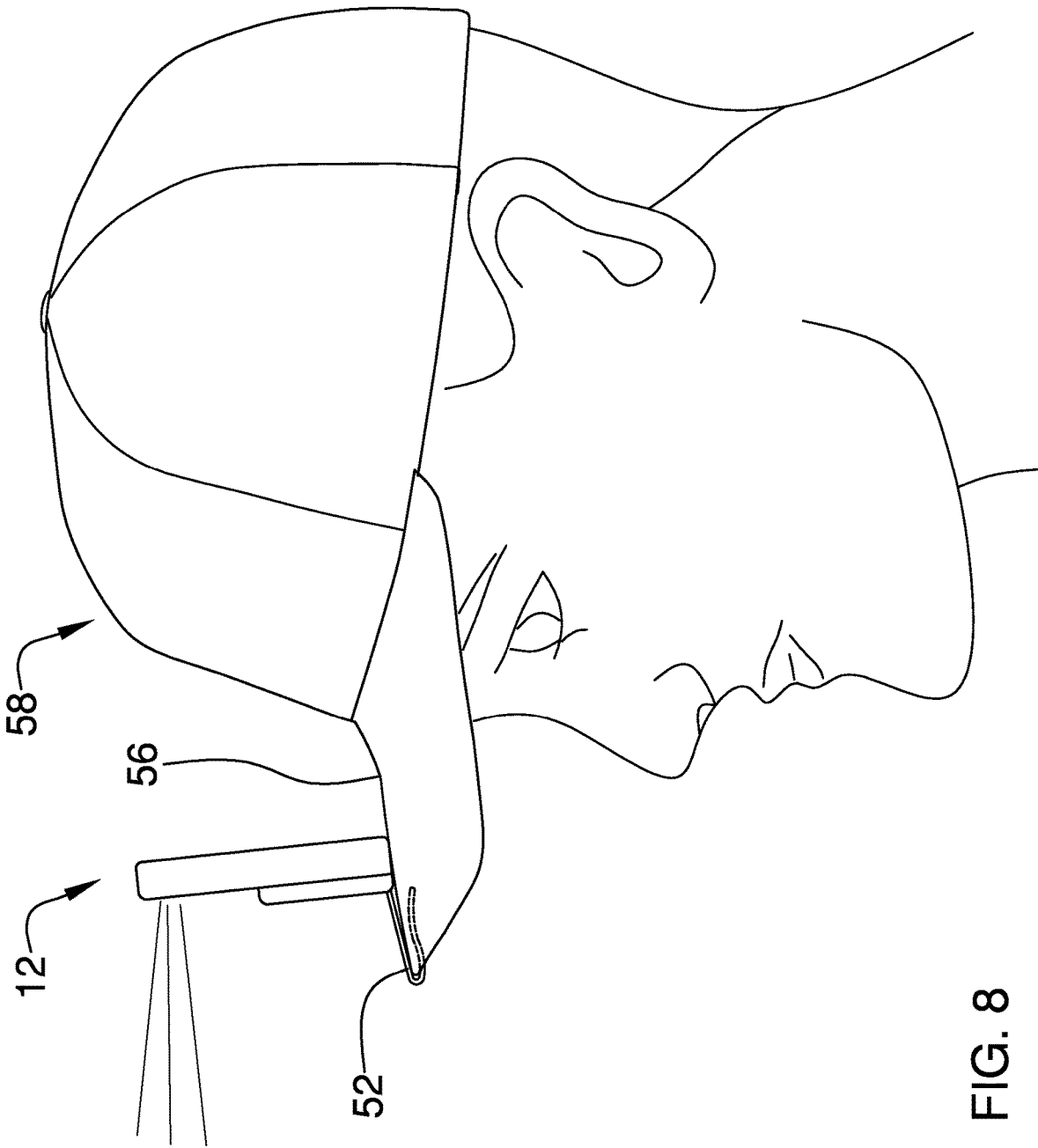
FIG. 8 is a left side in-use view of an embodiment of the disclosure.
Figure 9:
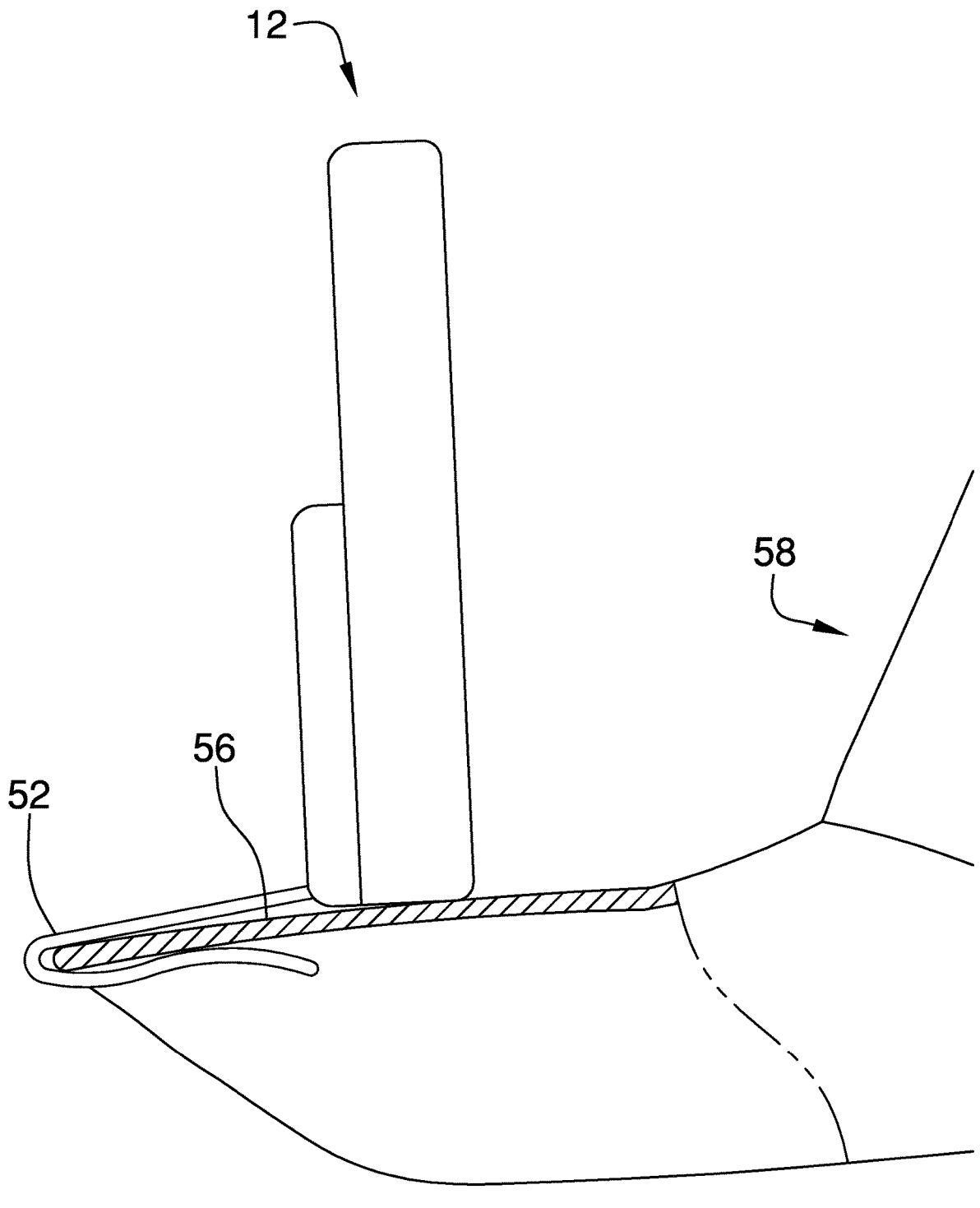
FIG. 9 is a cut-away in-use view of an embodiment of the disclosure.

With reference now to the drawings, and in particular to FIGS. 1 through 9 thereof, a new phone case device embodying the principles and concepts of an embodiment of the disclosure and generally designated by the reference numeral 10 will be described.

As best illustrated in FIGS. 1 through 9, the smart phone case assembly 10 generally comprises a case 12 that is structured to insertably receive a smart phone 14. The case 12 has a plurality of holes 16 extending through the case 12 and each of the holes 16 is strategically located to facilitate control buttons 18 of the smart phone 14 and a camera 20 of the smart phone 14 to be exposed when the smart phone 14 is positioned in the case 12. The case 12 has a rear wall 22 and a perimeter wall 24 extending away from the rear wall 22, and the perimeter wall 24 has a top side 26, a bottom side 28 and a first lateral side 30, and the rear wall 22 has a rear surface 32. The case 12 may be comprised of an impact resistant material thereby protecting the smart phone 14 from impact damage.

The plurality of holes 16 includes a set of control holes 34 and each of the control holes 34 extends through the perimeter wall 24. The control holes 34 are arranged into groups at strategic locations along the perimeter wall 24 to expose control buttons 18 and charging ports 36 on the smart phone 14 when the smart phone 14 is positioned in the case 12. The plurality of holes 16 includes a camera hole 38 which extends through the rear wall 22. The camera hole 38 is strategically located to expose the camera 20 when the smart phone 14 is positioned in the case 12.

The rear wall 22 has a ridge 40 extending away from the rear surface 32 and the ridge 40 has a plurality of intersecting sides 42 such that the ridge 40 defines a rectangular shape. The plurality of intersecting sides 42 includes a first side 44 and a second side 46 each extending between a third side 48 and a fourth side 50. The rectangular shape defined by the ridge 40 is elongated along an axis extending between the third side 48 and the fourth side 50. Furthermore, the ridge 40 is centrally positioned between the top side 26 and the bottom side 28 of the perimeter wall 24 of the case 12, and the third side 48 is aligned with the first lateral side 30 of the perimeter wall 24 of the case 12.

A clip 52 is hingedly disposed on the case 12 and the clip 52 is positionable in a stored position having the clip 52 resting against the case 12. Conversely, the clip 52 is positionable in a deployed position having the clip 52 angling away from the case 12. The clip 52 has an engaging space 54 for insertably receiving a brim 56 of a hat 58 when the clip 52 is in the deployed position. In this way the case 12 is secured to the brim 56 thereby facilitating the smart phone 14 to be oriented for recording video footage.

The clip 52 has a first end 60 and a second end 62, and the clip 52 has a bend 63 positioned between the first end 60 and the second end 62 to define a first portion 64 of the clip 52 lying against a second portion 66 of the clip 52. The first end 60 is associated with the first portion 64 and the second end 62 is associated with the second portion 66. The clip 52 includes a pivot 67 that is integrated into the second end 62 and the pivot 67 pivotally engages each of the first side 44 and the second side 46 of the ridge 40. The pivot 67 may comprise a hinge with a plurality of detents to facilitate the clip 52 to be retained at a variety of angles with the case 12.

The second portion 66 lies against the rear surface 32 of the rear wall 22 of the case 12 when the clip 52 is positioned in the stored position. The second portion 66 extends away from the rear surface 32 of the rear wall 22 at an adjustable angle when the clip 52 is positioned in the deployed position. The first portion 64 undulates between the bend 63 and the first end 60 such that the first end 60 is directed away from the second portion 66 thereby enhancing sliding the brim 56 of the hat 58 between the first portion 64 and the second portion 66. The rear wall 22 of the case 12 extends upwardly from the brim 56 of the hat 58 when the clip 52 is attached to the brim 56.

In use, the clip 52 is positioned in the deployed position and the brim 56 of the hat 58 is slid between the first portion 64 and the second portion 66 of the clip 52. In this way the case 12 is retained in a landscape orientation on the brim 56. Thus, the camera on the smart phone 14 can be employed for recording video in a hands free manner. The clip 52 can be removed from the brim 56 at any time to facilitate the smart phone 14 to be employed for texting or phone calls.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart phone case assembly for mounting a smart phone to a brim of a hat for recording video footage, said assembly comprising:

a case being structured to insertably receive a smart phone, said case having a plurality of holes extending through said case, each of said holes being strategically located to facilitate control buttons of said smart phone and a camera of said smart phone to be exposed when the smart phone is positioned in said case, said case including:

a rear wall and a perimeter wall extending away from said rear wall, said perimeter wall having a top side, a bottom side and a first lateral side, said rear wall having a rear surface;

said rear wall having a ridge extending away from said rear surface, said ridge having a plurality of intersecting sides such that said ridge defines a rectangular shape, said plurality of intersecting sides including a first side and a second side each extending between a third side and a fourth side; and a clip being hingedly disposed on said case, said clip being positionable in a stored position having said clip resting against said case, said clip being positionable in a deployed position having said clip angling away from said case, said clip having an engaging space for insertably receiving a brim of a hat when said clip is in said deployed position for securing said case to the brim thereby facilitating the smart phone to be oriented for recording video footage, said clip including:

a first end and a second end, said clip having a bend positioned between said first end and said second end to define a first portion of said clip lying against a second portion of said clip, said first end being associated with said first portion, said second end being associated with said second portion, said clip having a pivot being integrated into said second end, said pivot pivotally engaging each of said first side and said second side of said ridge.

2. The assembly according to claim 1, wherein: said plurality of holes includes a set of control holes, each of said control holes extending through said perimeter wall, said control holes being arranged into groups at strategic locations along said perimeter wall to expose control buttons and charging ports on the smart phone when the smart phone is positioned in said case; and said plurality of holes includes a camera hole extending through said rear wall, said camera hole being strategically located to expose the camera when the smart phone is positioned in said case.

3. The assembly according to claim 2, wherein said rectangular shape defined by said ridge is elongated along an axis extending between said third side and said fourth side.

4. The assembly according to claim 3, wherein said ridge is centrally positioned between said top side and said bottom side of said perimeter wall of said case, said third side being aligned with said first lateral side of said perimeter wall of said case.

5. The assembly according to claim 1, wherein said second portion lies against said rear surface of said rear wall of said case when said clip is positioned in said stored position, said second portion extending away from said rear surface of said rear wall at an adjustable angle when said clip is positioned in said deployed position.

6. The assembly according to claim 5, wherein said first portion undulates between said bend and said first end such that said first end is directed away from said second portion thereby enhancing sliding the brim of the hat between said first portion and said second portion.

7. The assembly according to claim 1, wherein said rear wall of said case extends upwardly from the brim of the hat when said clip is attached to the brim.

8. A smart phone case assembly for mounting a smart phone to a brim of a hat for recording video footage, said assembly comprising:

a case being structured to insertably receive a smart phone, said case having a plurality of holes extending through said case, each of said holes being strategically located to facilitate control buttons of said smart phone and a camera of said smart phone to be exposed when the smart phone is positioned in said case, said case having a rear wall and a perimeter wall extending away from said rear wall, said perimeter wall having a top side, a bottom side and a first lateral side, said rear wall having a rear surface, said plurality of holes including a set of control holes, each of said control holes extending through said perimeter wall, said control holes being arranged into groups at strategic locations along said perimeter wall to expose control buttons and charging ports on the smart phone when the smart phone is positioned in said case, said plurality of holes including a camera hole extending through said rear wall, said camera hole being strategically located to expose the camera when the smart phone is positioned in said case, said rear wall having a ridge extending away from said rear surface, said ridge having a plurality of intersecting sides such that said ridge defines a rectangular shape, said plurality of intersecting sides including a first side and a second side each extending between a third side and a fourth side, said rectangular shape defined by said ridge being elongated along an axis extending between said third side and said fourth side, said ridge being centrally positioned between said top side and said bottom side of said perimeter wall of said case, said third side being aligned with said first lateral side of said perimeter wall of said case; and a clip being hingedly disposed on said case, said clip being positionable in a stored position having said clip resting against said case, said clip being positionable in a deployed position having said clip angling away from said case, said clip having an engaging space for insertably receiving a brim of a hat when said clip is in said deployed position for securing said case to the brim thereby facilitating the smart phone to be oriented for recording video footage, said clip having a first end and a second end, said clip having a bend positioned between said first end and said second end to define a first portion of said clip lying against a second portion of said clip, said first end being associated with said first portion, said second end being associated with said second portion, said clip having a pivot being integrated into said second end, said pivot pivotally engaging each of said first side and said second side of said ridge, said second portion lying against said rear surface of said rear wall of said case when said clip is positioned in said stored position, said second portion extending away from said rear surface of said rear wall at an adjustable angle when said clip is positioned in said deployed position, said first portion undulating between said bend and said first end such that said first end is directed away from said second portion thereby enhancing sliding the brim of the hat between said first portion and said second portion, said rear wall of said case extending upwardly from the brim of the hat when said clip is attached to the brim.

9. A smart phone case system for mounting a smart phone to a brim of a hat for recording video footage, said system comprising:

a hat having a brim, said brim having a front edge;

a case being structured to insertably receive a smart phone, said case having a plurality of holes extending through said case, each of said holes being strategically located to facilitate control buttons of said smart phone and a camera of said smart phone to be exposed when the smart phone is positioned in said case, said case having a rear wall and a perimeter wall extending away from said rear wall, said perimeter wall having a top side, a bottom side and a first lateral side, said rear wall having a rear surface, said plurality of holes including a set of control holes, each of said control holes extending through said perimeter wall, said control holes being arranged into groups at strategic locations along said perimeter wall to expose control buttons and charging ports on the smart phone when the smart phone is positioned in said case, said plurality of holes including a camera hole extending through said rear wall, said camera hole being strategically located to expose the camera when the smart phone is positioned in said case, said rear wall having a ridge extending away from said rear surface, said ridge having a plurality of intersecting sides such that said ridge defines a rectangular shape, said plurality of intersecting sides including a first side and a second side each extending between a third side and a fourth side, said rectangular shape defined by said ridge being elongated along an axis extending between said third side and said fourth side, said ridge being centrally positioned between said top side and said bottom side of said perimeter wall of said case, said third side being aligned with said first lateral side of said perimeter wall of said case; and a clip being hingedly disposed on said case, said clip being positionable in a stored position having said clip resting against said case, said clip being positionable in a deployed position having said clip angling away from said case, said clip having an engaging space for insertably receiving said brim of said hat when said clip is in said deployed position for securing said case to said brim thereby facilitating the smart phone to be oriented for recording video footage, said clip having a first end and a second end, said clip having a bend positioned between said first end and said second end 5 to define a first portion of said clip lying against a second portion of said clip, said first end being associated with said first portion, said second end being associated with said second portion, said clip having a pivot being integrated into said second end, said pivot 10 pivotally engaging each of said first side and said second side of said ridge, said second portion lying against said rear surface of said rear wall of said case when said clip is positioned in said stored position, said second portion extending away from said rear surface 15 of said rear wall at an adjustable angle when said clip is positioned in said deployed position, said first portion undulating between said bend and said first end such that said first end is directed away from said second portion thereby enhancing sliding said front 20 edge of said brim of said hat between said first portion and said second portion, said rear wall of said case extending upwardly from said brim of said hat when said clip is attached to said brim.

\* \* \* \* \* 25